(12) United States Patent
Wang et al.

(10) Patent No.: US 10,861,454 B2
(45) Date of Patent: Dec. 8, 2020

(54) INTERACTIVE VOICE-ACTIVATED BOT WITH VISUAL CUE

(71) Applicant: MASTERCARD ASIA/PACIFIC PTE. LTD.

(72) Inventors: Zunhua Wang, Singapore (SG); Hui Fang, Singapore (SG); Shiying Lian, Singapore (SG)

(73) Assignee: MASTERCARD ASIA/PACIFIC PTE. LTD, Singapore (SG)

( * ) Notice: Subject to any disclaimer, the term of this patent is extended or adjusted under 35 U.S.C. 154(b) by 248 days.

(21) Appl. No.: 16/006,214

(22) Filed: Jun. 12, 2018

(65) Prior Publication Data

US 2019/0378505 A1    Dec. 12, 2019

(51) Int. Cl.
*G10L 15/22* (2006.01)
*G06F 3/16* (2006.01)
*G06Q 30/06* (2012.01)
*G10L 15/30* (2013.01)

(52) U.S. Cl.
CPC .............. *G10L 15/22* (2013.01); *G06F 3/167* (2013.01); *G06Q 30/0633* (2013.01); *G10L 15/30* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 6,144,938 | A * | 11/2000 | Surace | G10L 13/033 704/257 |
| 6,757,362 | B1 * | 6/2004 | Cooper | H04M 3/527 379/88.01 |
| 8,660,849 | B2 * | 2/2014 | Gruber | G06F 40/30 704/275 |
| 9,047,743 | B2 * | 6/2015 | Gulin | G08B 5/36 |
| 2005/0033582 | A1 * | 2/2005 | Gadd | G06Q 30/02 704/277 |
| 2010/0031150 | A1 * | 2/2010 | Andrew | G06F 3/167 715/728 |
| 2012/0134480 | A1 * | 5/2012 | Leeds | H04M 1/57 379/88.12 |
| 2013/0288654 | A1 * | 10/2013 | Jeon | H04L 67/125 455/417 |
| 2014/0376405 | A1 * | 12/2014 | Erickson | H04W 24/04 370/254 |
| 2016/0227284 | A1 * | 8/2016 | Ordille | H04N 21/44204 |
| 2019/0129517 | A1 * | 5/2019 | Wisnia | H04W 12/08 |
| 2019/0339950 | A1 * | 11/2019 | Meyer | G06K 9/6218 |
| 2019/0355384 | A1 * | 11/2019 | Sereshki | G10L 15/22 |

* cited by examiner

*Primary Examiner* — Neeraj Sharma
(74) *Attorney, Agent, or Firm* — Buckley, Maschoff & Talwalkar LLC

(57) ABSTRACT

A method includes a voice-activated device establishing a communication channel with a mobile device through a communication interface, receiving a voice command of a user to perform an action, determining, in response to the voice command, the action based at least in part on the voice command, and outputting an audible response corresponding to the determined action. During outputting of the audible response, visual data that includes a representation of the determined action is displayed on the mobile device. The user is enabled to validate or modify the visual data via a user interface of the mobile device.

18 Claims, 6 Drawing Sheets

INTERACTIVE VOICE-ACTIVATED BOT WITH VISUAL CUE

BACKGROUND

The subject matter disclosed herein relates to intelligent electronic products, and more particularly, to using voice bots (e.g., multi-functional intelligent/smart speakers) to accomplish tasks.

Voice bot technology, which utilize voice commands and artificial intelligence (AI), has become increasingly integrated into consumers' lives, providing voice-implemented intelligent personal assistant software services in domestic areas such as a user's home or office. Voice platforms can be implemented in several fields such as retail, e-commerce, finance, healthcare, and transportation. Currently, however, voice bots cannot be efficiently and effectively used in commercial or public environments (e.g., retail establishments such as department stores, supermarkets, shopping centers, etc.), as they are designed for an individual user (e.g., voice bot configured during a device setup procedure).

One issue faced by retailers is gaining consumer confidence in using voice bot technology for shopping tasks. Given the advancing state of the technology, users come to have high expectations for their experiences with voice bots. Because natural language processing (NLP) is not without its challenges, voice bots often do not live up to these expectations. For example, once an order is made, it is difficult and cumbersome to change the order using merely vocal interactions.

Thus, there is a need for a way to enhance a user's shopping experience to make personal shopping assistance via voice bot more efficient and appealing. What is needed is a system and method capable of providing additional channels of communication when interacting with a voice bot, for example, providing a visual cue (e.g., on a display interface) via which a user of the system is able to view and modify an order. In this way, user experience may be optimized.

BRIEF DESCRIPTION OF THE DRAWINGS

Features and advantages of some embodiments of the present disclosure, and the manner in which the same are accomplished, will become more readily apparent upon consideration of the following detailed description taken in conjunction with the accompanying drawings, which illustrate preferred and example embodiments and which are not necessarily drawn to scale, wherein.

Figure 1:
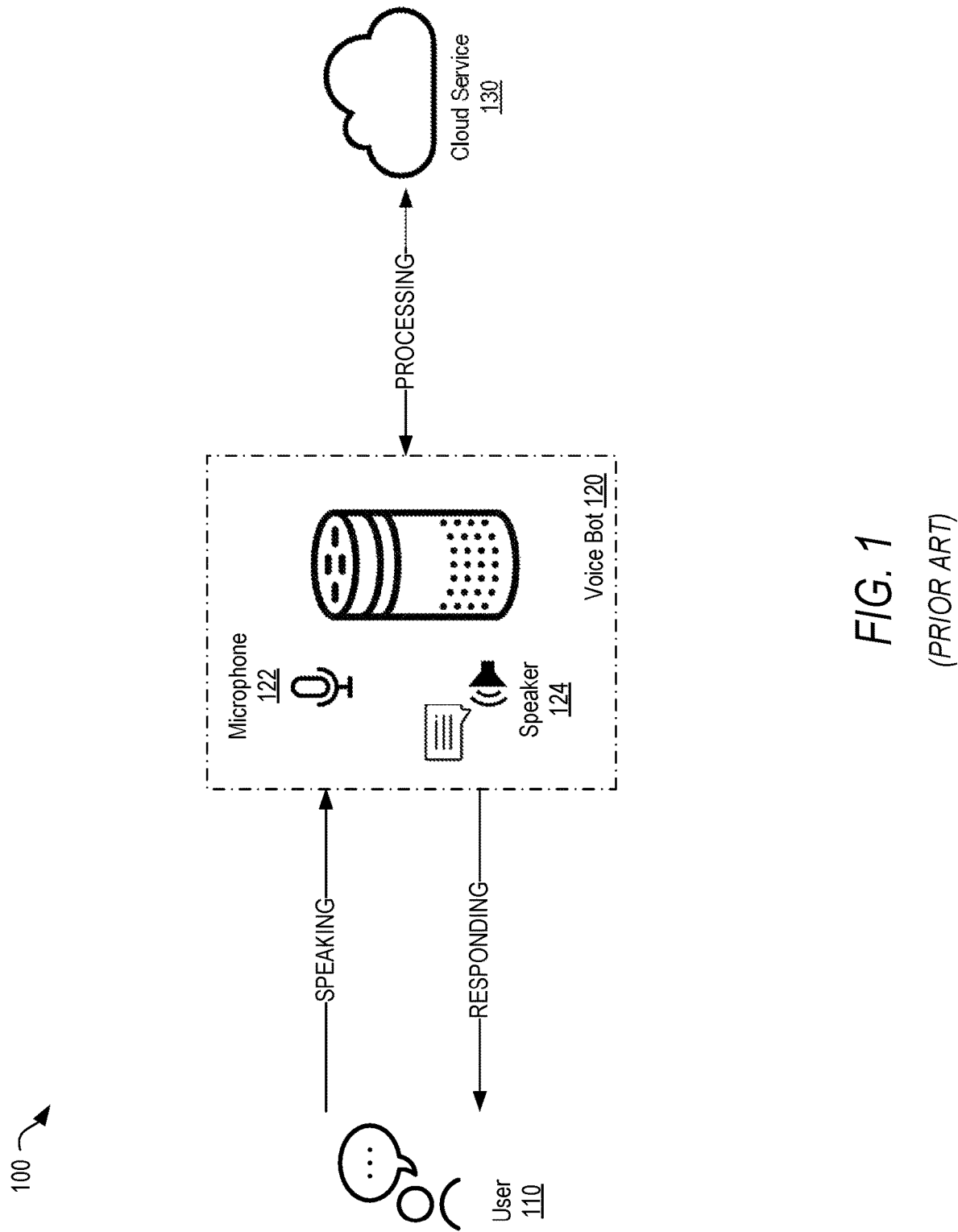
FIG. 1 is a diagram that illustrates a conventional voice interaction system.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

For the purposes of this disclosure, a "voice bot" (also referred to as "voice-activated device" or "voice-controlled device" or "voice computing device", or simply as "smart speaker" or "intelligent speaker") is a type of wireless speaker and voice command device with an integrated virtual assistant. A voice bot responds to voice commands to perform desired actions/services (e.g., to shop online, answer search queries, create to-do and/or shopping lists, etc.).

Initially, by way of background, aspects of a conventional voice interaction system will now be described with reference to FIG. 1.

FIG. 1 is a block diagram that illustrates a conventional voice interaction system 100.

The system 100 includes a conventional voice bot 120. The voice bot 120 includes one or more microphones or listening devices 122 that receive audio input and one or more speakers 124 to output audio signals, as well as processing and communications capabilities. User 110 may interact with the voice bot 120 via voice commands, and microphone(s) 122 capture the user's speech. The voice bot 120 communicates back to the user 110 by emitting audible response(s) through speaker(s) 124. Voice bot 120 has no graphical user interface (GUI). The user 110 interacts with the voice bot 120 merely through speech, without use of a keyboard or display.

Cloud-based service 130 collects and stores information in the cloud. Most of the complex operations such as speech recognition, machine learning, and natural language understanding are handled in the cloud by cloud-based service 130.

Voice-activated smart speakers typically use words called "hotwords" (e.g., keywords) to activate a voice interface. For example, user 110 may issue a voice command to voice bot 120 similar to, "Computer, add [item name] to my cart," using the name of the item he or she wants to add. Voice bot 120 may then add the specified item to the user's online shopping cart or bag. In this way, the voice bot 120 may be used to keep a to-do or shopping list.

When it comes to voice purchasing, a user 110 may issue a voice command to bot 120 similar to, "Computer, order

[item name]," using the name of the item he or she wants to order. With voice purchasing, a user can buy multiple units of the same item, for example "Computer, order two [item name]." However, the user cannot add different items in the same order/transaction. Each unique item requires its own transaction. The user will need to tell the voice-activated device about each order separately.

Once the user is ready to place the order, user is able to confirm his or her choice by listening to the output (e.g., confirming the product name and price), and the order is placed.

Without visual cues, however, a user of the voice interaction system 100 can only rely on the audio response(s) given by voice bot 120, making it difficult to confirm the right quantity, edition, brand, type, model, flavor, and the like associated with items in his or her online shopping cart. Consequently, the user may end up accidentally purchasing the wrong product(s).

Furthermore, any changes or modifications are cumbersome to execute using the voice bot 120. For example, if user 110 desires any modifications, typically the order will need to be cancelled and then replaced, and/or handled by a customer service associate at a call center. Additionally or alternatively, the user may need to issue additional voice commands to voice bot 120 in order to modify the order and/or to determine that the order is correct and complete.

The present inventors have now recognized that there are opportunities to improve user experience in the shopping process, particularly in situations where a robot and a mobile device (e.g., smartphone) are employed for the transaction.

Figure 2:
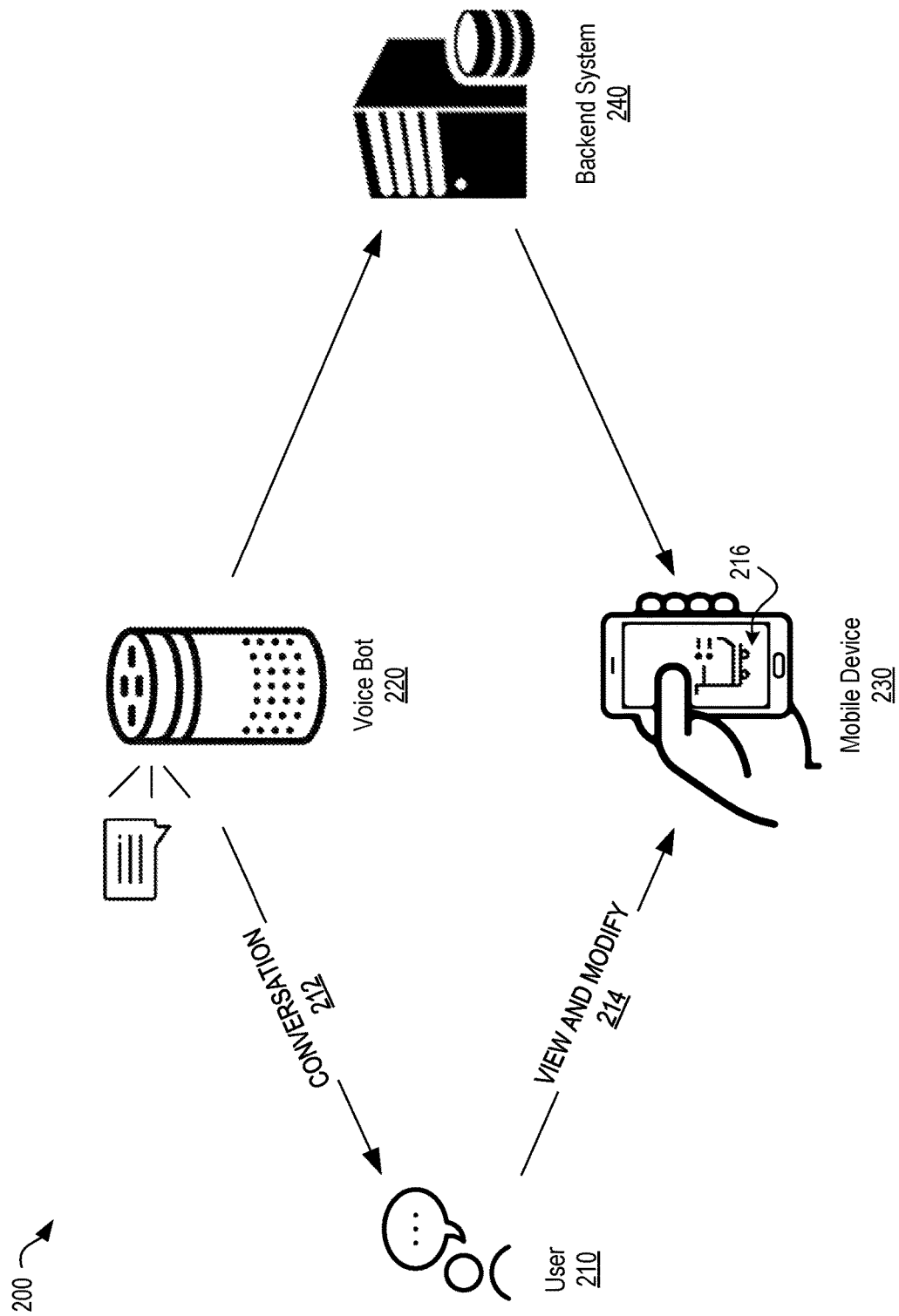
FIG. 2 is a diagram that illustrates a human-computer interaction system in connection with which aspects of the present disclosure may be applied.

Reference is now made to FIG. 2, which is a schematic illustration of an example embodiment. More specifically, FIG. 2 is a diagram 200 that illustrates a voice-initiated transaction of a human-computer interaction system 200 comprising a voice bot 220, a user 210 operating a mobile processing device 230, and a backend system 240, in connection with which aspects of the present disclosure may be applied.

Initially, a user 210 (also referred to as "customer") enters a location with a mobile device 230 (e.g., cell phone owned by the shopper). In an example embodiment, the location is a commercial or public space (e.g., a department store, supermarket, shopping center, etc.). In lieu of human customer service associates, one or more voice bots 220 are available on location to assist users with various queries and tasks (e.g., to find items, set up orders, etc.).

Before doing so, voice bot 220 establishes a pairing with user's mobile device 230 through a process such as a Bluetooth-based pairing process. In this way, voice bot 220 supports multi-users without limiting the number of users that are allowed to engage with the device. In the example embodiments herein, there is advantageously no need to log in or switch between different accounts in order to interact with the voice bot 220. That is, there is no user account pre-binding and no application installation is required. Further details of this pairing operation will be provided in later portions of this document, including the below discussion of FIG. 3.

Voice bot 220 is then ready for voice-based search, questions, and commands from user 210 in connection with shopping tasks, other personal-assistant tasks, or the like. Voice bot 220 is arranged to listen to voice commands from one or more users and to give audio responses to the users, at 212, mimicking human-like conversation. Products in this category may offer a voice-implemented intelligent personal assistant software service. For example, voice bots may facilitate the purchasing or ordering of items via voice commands from users to improve their shopping/ordering experience (e.g., instead of real person assistance).

In some embodiments, voice bot 220 uses speech recognition technologies to allow user input through spoken commands. Software identifies the spoken words and converts them to a machine-readable format for interaction.

Additionally, in this and other embodiments, an additional channel of communication is available at 214. For example, a visual cue 216 is provided to the user's mobile device 230. The mobile device 230 may include a housing. In some embodiments, the front of the housing is predominantly constituted by a touch screen, which is a key element of the user interface of the mobile device 230. As is typical for mobile devices, the mobile device 230 may include mobile communications functions. The mobile communications functions may include voice and data communications via a mobile communication network (not shown) with which the mobile device 230 is registered.

The visual cue 216 may identify and track an existing order made via conversation 212 with bot 220. For example, a touch screen display of mobile device 230 displays a visual output of an existing order to the user, which may include text, graphics, video, and any combination thereof. The touch screen provides both an output interface and an input interface between the voice bot and the user. The visual cue 216 allows customers to check their shopping basket's contents, verify the item quantities, colors, styles, the total price of an order, and/or the like.

In some embodiments, the visual cue 216 provides editable feature(s) that user 210 is able to view and modify, at 214, through the mobile device 230. For example, users 210 can replace items in an existing order with a different item, possibly at a different quantity, a different edition, brand, type, model, flavor, or the like, with one or a few simple taps or swipes of their mobile device 230. This additional communication channel through mediums other than purely voice-based input provides improved experience for users interacting with virtual assistants. Order accuracy reflecting user's intention is improved. Manpower cost is reduced.

It has been posited that the mobile device 230 may be embodied as a smartphone, but this assumption is not intended to be limiting, as mobile device 230 may alternatively, in at least some cases, be constituted by a tablet computer, a smartwatch or by other types of portable electronic devices.

The two channels of communication, conversation channel 212 and modification channel 214, work together with backend system 240. Backend system 240 processes, records, and accepts user modifications and pushes notifications to users, either through voice bot 220 or the mobile device 230.

In some embodiments, backend system 240 may receive content from voice bot 220 and push content to mobile device 230. A synchronization process between the mobile device 230 and the backend system 240 may be performed to acquire the latest order information from the backend system 240. For example, the order information may be updated to reflect current conversation 212 between the user 210 and the voice bot 220.

In an example use-case, a user 210 can begin building an order via conversation with voice bot 220. User 210 can confirm/validate his or her choice by listening to the audio output 212 from voice bot 220. Additionally or alternatively, voice bot 220 may forward the user's order to a backend server computer at backend system 240 which, in turn, pushes notification(s) (e.g., the order) to mobile device 230 so that user 210 can view and track an existing order made via conversation channel 212 using visual cue(s) 216 (e.g., mobile web view). Additionally, mobile device 230 may send updates to backend server 240.

Further details of an example shopping flow will be provided in later portions of this document, including the below discussion of FIG. 5.

Figure 3:
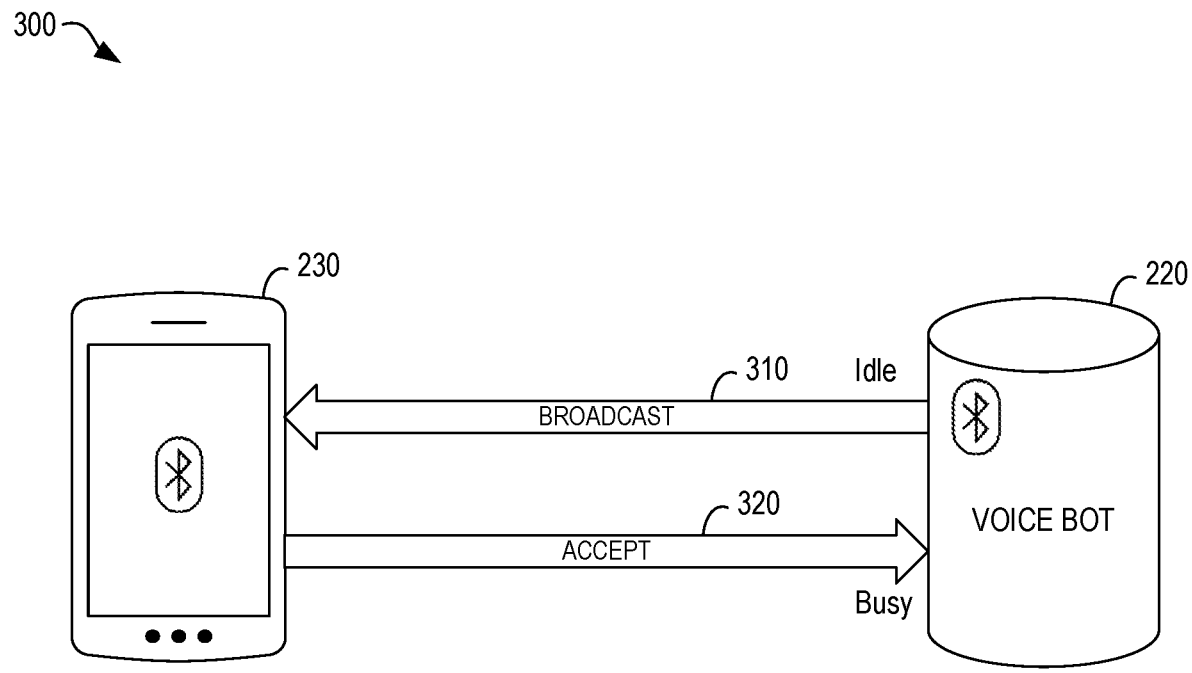
FIG. 3 is a diagram illustrating an example pairing operation to pair an example mobile device and an example voice bot in the example human-computer interaction system of FIG. 2.

FIG. 3 is a diagram illustrating an example pairing operation 300 to pair the voice bot 220 and the mobile device 230 in the example human-computer interaction system 200 of FIG. 2.

Voice bot 220 may comprise a plurality of wireless network interfaces. In an example embodiment, voice bot 220 includes a Bluetooth Low Energy (BLE) radio communication interface. For the purposes of this disclosure, "BTLE" or "BLE" refers to Bluetooth Low Energy communication hardware and/or software.

Voice bot 220 acts as a Bluetooth beacon that uses a short-range radio frequency protocol (e.g., BLE) to scan (e.g., search) for other devices. In one embodiment, the voice bot 220 constantly transmits radio signals (e.g., beacon signals) to nearby devices. In another embodiment, the voice bot periodically transmits the beacon signal. Alternatively, the voice bot transmits the beacon signal whenever triggered.

The information/signals being broadcast at 310 can be heard by compatible devices (e.g., smart devices such as smartphones and tablets having Bluetooth capabilities) as they come within range (e.g., in close proximity) of a relevant beacon (e.g. voice bot 220). In an example embodiment, mobile device 230 is Bluetooth-enabled and supports BLE.

Other modes/communications between the two devices are also contemplated. For example, it is contemplated that other suitable wireless communication protocols, including WiFi, Bluetooth, near field communication (NFC), or the like, may be utilized.

Once the voice bot 220 and the user device 230 are physically close enough to each other (e.g., voice bot detects nearby user device), a fast pairing process may be triggered. Software (e.g., mobile apps) on a receiving device 230 listens for the signals being broadcast (e.g., a voice bot pairing request), and uses the signals received from the beacon 220 to trigger an action on the receiving device 230, including sending a push message or notification on the receiving device 230.

The pairing process is quick and requires no user login (e.g., anonymous pairing). That is, no personally identifiable information pertaining to the user 210 is needed to be shared. Once user 210 accepts a pairing request at 320, a circuit connection is established between the user's mobile device 230 and the bot 220, and BLE is used to push a notification to the user's device 230. In an example embodiment, a user at mobile device 230 receives a notification on the device 230 to launch a website provided by a merchant.

In some embodiments, once voice bot 220 receives response 320 from mobile device 230, it obtains and records the user device's identity information in the background. The device identity information may be obtained in the background so that a user is unaware if its executing. In one embodiment, the device identity information may be an International Mobile Subscriber Identity (IMSI) number or a Mobile Station Integrated Services Digital Network (MSISDN) number, which are sets of numbers that uniquely identify a mobile device, typically stored in a mobile phone's Subscriber Identity Module (SIM) card and allow access to the device through wireless technology. In some embodiments, the device identity information may be stored in a storage device (e.g., backend server 240). Information on past interaction history may also be stored with the device identity information.

This convenient quick pairing feature may help retailers provide personalized guidance for customers based on a customer's previous shopping habits (e.g., when customers interact with the voice bot at a later time).

Figure 4:
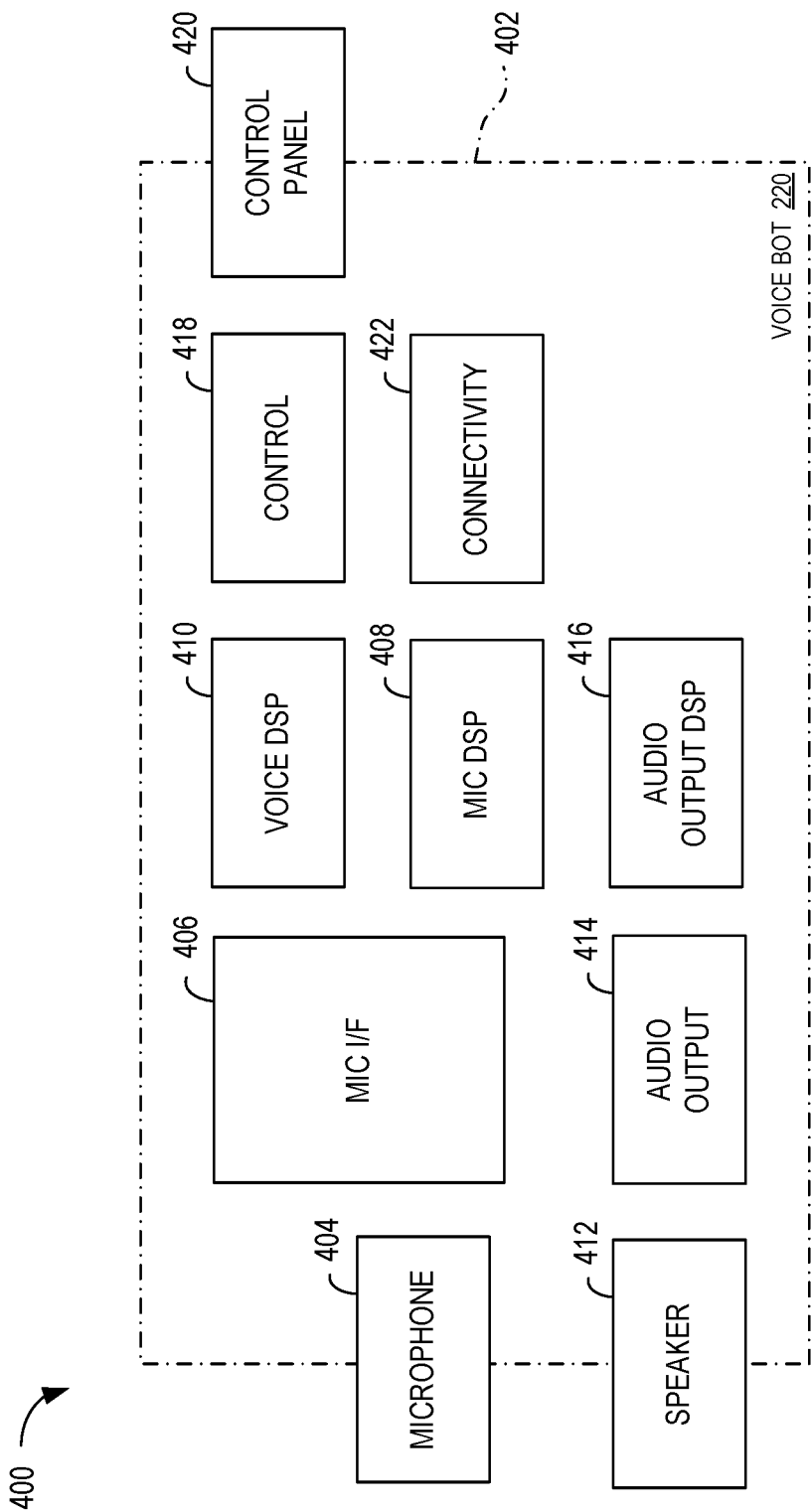
FIG. 4 is a block diagram that illustrates aspects of a voice bot that is part of the system of FIG. 2.

FIG. 4 is a block diagram 400 that illustrates aspects of the voice bot 220. In its hardware aspects, the voice bot 220 may resemble the hardware aspects of one or more commercially available voice bots.

The voice bot 220 may include a housing 402 that contains and/or supports other components of the voice bot 220. The voice bot 220 may also include one or more microphones 404. The microphones may be positioned and/or configured to detect and capture voice utterances of one or more users located in the same room (not shown) with the voice bot 220. The voice bot 220 may also include a microphone interface circuit 406. The microphone interface circuit 406 may perform functions such as filtering and analog-to-digital conversion with respect to input audio signals generated by the microphones 404.

Still further, the voice bot 220 may include a microphone digital signal processor (DSP) 408. The microphone DSP 408 may perform functions such as beam forming, echo cancellation, noise suppression and de-reverb processing with respect to the incoming audio signal as obtained via the microphone interface circuit 406.

In addition, the voice bot 220 may include a voice DSP 410. The voice DSP 410 may perform functions such as direction of arrival detection and voice activity detection with respect to the incoming audio signal.

The voice bot 220 may also include one or more speakers 412. The voice bot may provide audio responses to the user's utterances via the speaker 212. The voice bot 220 may include an audio output circuit 414 to drive the speaker 412. There may also be an audio output DSP 416 that is included in the voice bot 220. The audio output DSP 416 may process the output audio signal before the output audio signal is supplied to the audio output circuit 414.

Moreover, the voice bot 220 may include a control circuit 418. The control circuit 418 may include processing, memory and/or program storage resources (not separately shown). The control circuit 418 may control overall operation of the voice bot 220. The control circuit 418 may also implement voice and speech recognition processing, as well as the above-mentioned voice-implemented intelligent personal assistant function. Still further, the control circuit 418 may synthesize speech for audio responses to be provided by the assistant function. Other software features of the voice bot 220 may also be implemented by the control circuit 418.

Also, the voice bot 220 may include a control panel 420. The control panel 420 may include, for example, LEDs and/or user-actuatable buttons that may provide additional input/output functionality in addition to the speech/audio response interactions referred to above.

Further, the voice bot 220 may include a connectivity module 422. The connectivity module 422 may provide data communication connectivity for the voice bot 220 with one or more data networks and/or one or more other devices.

In some embodiments, the voice bot 220 may be implemented in mobile robot. For example, the voice bot may comprise a head and a movable chassis (e.g., including wheels) connected with the head through a body.

Figure 5:
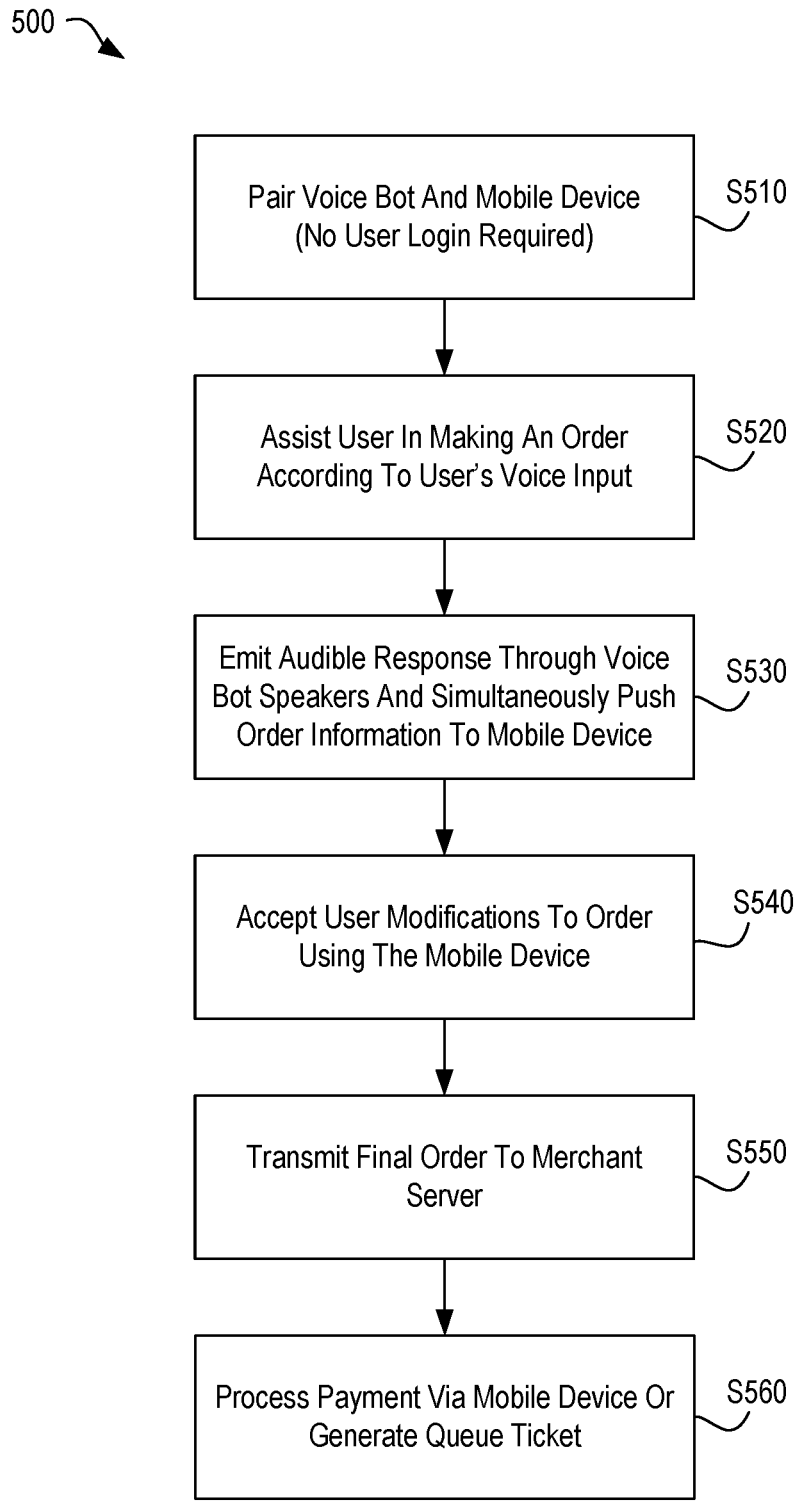
FIG. 5 is a flow chart that illustrates a process that may be performed in accordance with aspects of the present disclosure in the system of FIG. 2.

FIG. 5 is a flow chart that illustrates a process 500 that may be performed according to aspects of the present disclosure in the system of FIG. 2.

Initially, at S510, the quick pairing operation as described above with respect to FIG. 3 is performed to pair voice bot 220 with mobile device 230. No user login is required at this step.

Using speech and/or voice recognition technology, at S520, voice bot 220 assists user 210 in making an order (e.g., performing an action, including one or more item selections) according to a user's voice input/command. In turn at S530, voice bot 220 may emit an audible response (e.g., order information or confirmation) relating to the voice-initiated order. Additionally or alternatively, that order information is simultaneously pushed to mobile device 230, providing a visual cue (e.g., visual representation of the voice-initiated order). In some embodiments, the order information is presented in a web view on the mobile device. The visual cue provides a quick and convenient way for users to track, view, and directly modify an existing order.

At S540, user 210 may then confirm or edit the order as needed using the mobile device 230. The final version of the order is displayed on the mobile device, allowing the user to visualize any content changes immediately. Any ambiguities regarding the order can be efficiently resolved, improving user's ability to accomplish tasks.

In some embodiments, when additional voice input/command(s) of the user are received by voice bot 220 to perform additional action(s), steps S520 through S540 are repeated for the additional voice command(s). For example, in response to an additional voice command received by voice bot 220, an additional action based at least in part on the additional voice command is determined at S520. The voice bot 220 outputs a subsequent audible response at S530 corresponding to the determined additional action. While outputting the subsequent audible response, the visual data 216 on the mobile device is updated at S530 to include a representation of the additional action. Users may confirm or continue to edit/modify the visual data 216 (e.g., determined action(s)) as needed at S540 using the mobile device 230.

In turn, at S550, the final version of the order may be transmitted to a merchant server computing device, or any other payment service provider for processing the order. In one embodiments, user 210 may make a payment via mobile device 230. In another embodiment, a queue ticket is generated and user 210 may place the final order through a service person (e.g., sales associate).

A human-computer interaction system as described above may be a highly efficient mode of making voice-initiated actions/transactions by leveraging Bluetooth Low Energy (BLE) (e.g., Bluetooth 4.0 or later improved versions).

Figure 6:
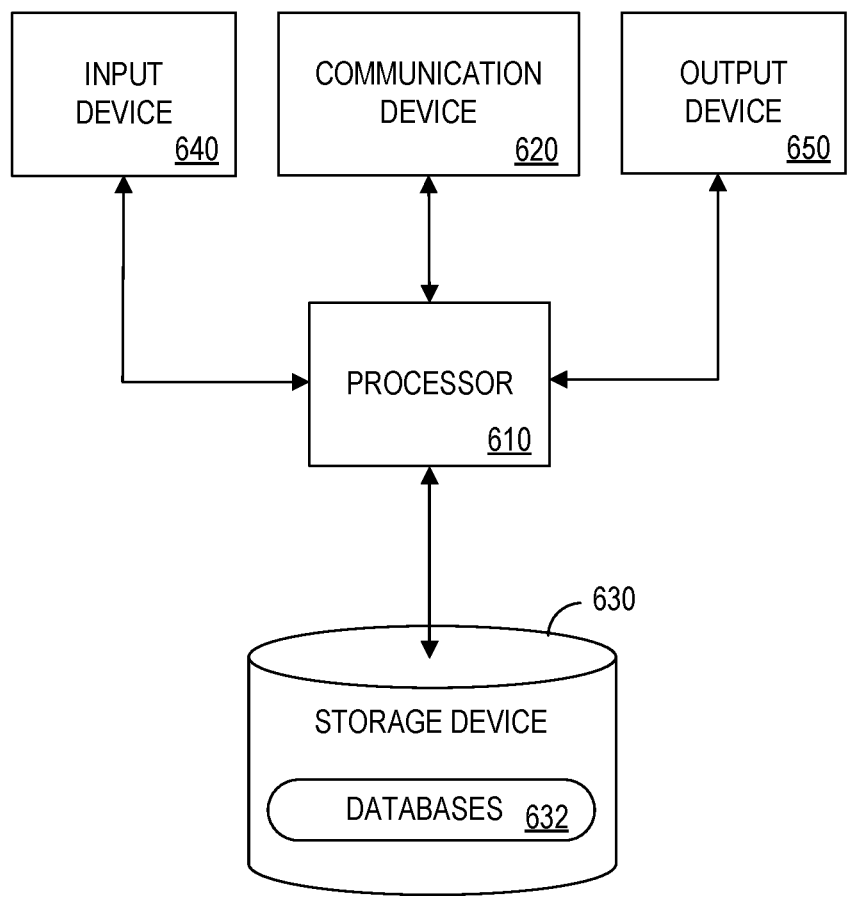
FIG. 6 is a block diagram that illustrates a backend computer system that may perform a role in the system illustrated in FIG. 2.

FIG. 6 is a block diagram that illustrates an example embodiment of the backend computer system 240 (e.g., server computer system). The backend computer system 240 may be constituted by server computer and/or mainframe computer hardware.

The backend computer system 240 may include a computer processor 610 operatively coupled to a communication device 620, a storage device 630, an input device 640, and an output device 650. The computer processor 610 may be in communication with the communication device 620, the storage device 630, the input device 640, and the output device 650.

The computer processor 610 may be constituted by one or more processors. Processor 610 operates to execute processor-executable steps, contained in program instructions described below, so as to control the server computer 240 to provide desired functionality.

Communication device 620 may be used to facilitate communication with, for example, other devices (such as devices operated by shoppers, etc.). For example, communication device 620 may comprise communication ports (not separately shown), to allow the server computer 240 to communicate simultaneously with other devices and computers.

Input device 640 may comprise one or more of any type of peripheral device typically used to input data into a computer. For example, the input device 640 may include a keyboard and a mouse. Output device 650 may comprise, for example, a display and/or a printer.

Storage device 630 may comprise any appropriate information storage device, including combinations of magnetic storage devices (e.g., hard disk drives), optical storage devices such as CDs and/or DVDs, and/or semiconductor memory devices such as Random-Access Memory (RAM) devices and Read Only Memory (ROM) devices, as well as so-called flash memory. Any one or more of such information storage devices may be considered to be a computer-readable storage medium or a computer usable medium or a memory.

Storage device 630 stores one or more programs for controlling processor 610. The programs comprise program instructions (which may be referred to as computer readable program code means) that contain processor-executable process steps of the server computer 240, executed by the processor 610 to cause the server computer 240 to function as described herein.

The programs stored by the storage device 630 may include one or more operating systems (not shown) that control the processor 610 so as to manage and coordinate activities and sharing of resources in the server computer 240, and to serve as a host for application programs that run on the server computer 240.

The storage device 630 may also store one or more databases 632 required for operation of the server computer 240.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

As used herein and in the appended claims, a "server" includes a computer device or system that responds to numerous requests for service from other devices.

The above descriptions and illustrations of processes herein should not be considered to imply a fixed order for performing the process steps. Rather, the process steps may be performed in any order that is practicable, including simultaneous performance of at least some steps.

Although the present disclosure has been set forth in relation to specific example embodiments, it should be understood that various changes, substitutions, and alterations apparent to those skilled in the art can be made to the disclosed embodiments without departing from the spirit and scope of the disclosure as set forth in the appended claims.

What is claimed is:

1. An interactive voice-activated method comprising:
establishing, by a voice-activated device located in a commercial space, a communication channel with a mobile device of a user through a communication interface;
obtaining, by the voice-activated device from the user mobile device, user device identity information;
transmitting, by the voice-activated device to a backend system, the user device identity information, wherein the user device identity information is associated with past interaction data between the user mobile device and the voice-activated device, and wherein the user device identity information is stored by the backend system;
receiving, by the voice-activated device, a voice command of the user to perform an action associated with shopping tasks;
determining, by the voice-activated device in response to the voice command, the action based at least in part on the voice command;
outputting, by the voice-activated device, an audible response corresponding to the determined action; and
transmitting, by the voice-activated device while outputting the audible response, data concerning the action to the backend system causing the backend system to utilize the user device identity information to provide visual data that includes a representation of the determined action to the user mobile device for display on a display screen enabling the user to at least one of validate, modify, replace or add to the visual data via a user interface of the user mobile device.

2. The method of claim 1, wherein establishing the communication channel further comprises the voice-activated device searching for and connecting to the mobile device using Bluetooth Low Energy (BLE) communication.

3. The method of claim 1, wherein the modifying is accomplished via a web page accessed from the mobile device.

4. The method of claim 1, wherein modifying the visual data modifies the determined action and finalizes the determined action, and further comprising transmitting the modified visual data to the backend system.

5. The method of claim 1, wherein the voice command includes a request to add a product to a shopping list.

6. The method of claim 1, wherein the visual data comprises a text data.

7. The method of claim 1, wherein the user mobile device is a smartphone.

8. The method of claim 1, further comprising:
receiving, by the voice-activated device, additional voice commands of the user to perform additional actions; and
processing the additional voice commands of the user including:
determining, in response to an additional voice command, an additional action based at least in part on the additional voice command;
outputting, by the voice-activated device, a subsequent audible response corresponding to the determined additional action; and
while outputting the subsequent audible response, updating, on the mobile device, the visual data to reflect a representation of the initial action and the additional actions.

9. An interactive voice-activated system comprising:
a voice-activated device processor; and
a memory in communication with the voice-activated device processor, the memory storing program instructions, the voice-activated device processor operative with the program instructions to perform functions as follows:
establish a communication channel between a voice-activated device located in a commercial space and a user mobile device through a communication interface;
obtain user device identity information from the user mobile device wherein the user device identity information is associated with past interaction data between the user mobile device and the voice-activated device, and wherein the user device identity information is stored by the backend system;
transmit the user device identity information to a backend system;
receive a voice command of the user to perform an action associated with shopping tasks;
determine, in response to the voice command, the action based at least in part on the voice command;
output an audible response corresponding to the determined action; and
transmit while outputting the audible response, data concerning the action to the backend system causing the backend system to utilize the user device identity information to provide visual data that includes a representation of the determined action to the user mobile device for display on a display screen to enable the user to at least one of validate, modify, replace or add to the visual data via a user interface of the user mobile device.

10. The system of claim 9, wherein establishing the communication channel further comprises the voice-activated device searching for and connecting to the user mobile device using Bluetooth Low Energy (BLE) communication.

11. The system of claim 9, wherein the modifying is accomplished via a web page accessed from the user mobile device.

12. The system of claim 9, wherein modifying the visual data modifies the determined action and finalizes the determined action, and further comprising transmitting the modified visual data to a server computer.

13. The system of claim 9, wherein the voice command includes a request to add a product to a shopping list.

14. The system of claim 9, wherein the visual data comprises a text data.

15. The system of claim 9, wherein the user mobile device is a smartphone.

16. The system of claim 9, wherein the processor is further configured to:
receive additional voice commands of the user to perform additional actions; and
process the additional voice commands of the user including:
determining, in response to an additional voice command, an additional action based at least in part on the additional voice command;
outputting a subsequent audible response corresponding to the determined additional action; and
while outputting the subsequent audible response, updating the visual data on the mobile device to reflect a representation of the initial action and the additional actions.

17. A non-transitory computer readable medium having stored therein instructions that when executed cause a computer to perform an interactive voice-activated method comprising:

establishing, by a voice-activated device located in a commercial space, a communication channel with a mobile device of a user through a communication interface;

obtaining, by the voice-activated device from the user mobile device, user device identity information, wherein the user device identity information is associated with past interaction data between the user mobile device and the voice-activated device, and wherein the use device identity information is stored by the backend system;

transmitting, by the voice-activated device to a backend system, the user device identity information;

receiving, by the voice-activated device, a voice command of the user to perform an action associated with shopping tasks;

determining, by the voice-activated device in response to the voice command, the action based at least in part on the voice command;

outputting, by the voice-activated device, an audible response corresponding to the determined action; and transmitting, by the voice-activated device while outputting the audible response, data concerning the action to the backend system causing the backend system to utilize the user device identity information to provide visual data that includes a representation of the determined action to the user mobile device for display on a display screen enabling the user to at least one of validate, modify, replace or add to the visual data via a user interface of the user mobile device.

18. The non-transitory computer readable medium of claim 17, wherein establishing the communication channel further comprises the voice-activated device searching for and connecting to the mobile device using Bluetooth Low Energy (BLE) communication.

* * * * *